(12) United States Patent
Layne et al.

(10) Patent No.: US 7,250,830 B2
(45) Date of Patent: Jul. 31, 2007

(54) DUAL BAND FULL DUPLEX MOBILE RADIO

(75) Inventors: Dennis Ray Layne, Forest, VA (US); John Alan Greenwood, Jr., Forest, VA (US); Brian Douglas Justin, Jr., Lynchburg, VA (US)

(73) Assignee: M/A Com Inc., Lowell, MA (US)

( * ) Notice: Subject to any disclaimer, the term of this patent is extended or adjusted under 35 U.S.C. 154(b) by 73 days.

(21) Appl. No.: 11/026,832

(22) Filed: Dec. 30, 2004

(65) Prior Publication Data

US 2006/0145781 A1   Jul. 6, 2006

(51) Int. Cl.
*H03H 7/46* (2006.01)
(52) U.S. Cl. ............... 333/132; 333/126; 333/129
(58) Field of Classification Search .......... 333/132, 333/126, 129
See application file for complete search history.

(56) References Cited

U.S. PATENT DOCUMENTS

| | | | | |
|---|---|---|---|---|
| 4,951,060 A | * | 8/1990 | Cohn | 342/175 |
| 6,163,237 A | * | 12/2000 | Toda et al. | 333/206 |
| 6,643,522 B1 | * | 11/2003 | Young | 455/552.1 |
| 6,993,286 B2 | * | 1/2006 | Zhen et al. | 455/7 |
| 6,993,356 B2 | * | 1/2006 | Herzinger | 455/522 |

FOREIGN PATENT DOCUMENTS

WO   WO98010525   * 3/1998

* cited by examiner

*Primary Examiner*—Robert Pascal
*Assistant Examiner*—Kimberly E Glenn

(57) ABSTRACT

A dual band full duplex mobile radio is provided that includes a transmit portion including a dual band filter and a receive portion including a dual band filter. The dual band full duplex mobile radio further includes a circulator connecting the transmit portion and the receive portion and configured to provide transmit and receive switching.

16 Claims, 2 Drawing Sheets

DUAL BAND FULL DUPLEX MOBILE RADIO

BACKGROUND OF THE INVENTION

This invention relates generally to mobile radios, and more particularly, to dual band full duplex mobile radios.

Land mobile radios may be used to provide communication between different mobile units. Land mobile radio band communication, and in particular, public safety radio communication (e.g., police, fire department, etc.), is available within the 800 MHz frequency band. Part of this frequency band is allocated by the Federal Communications Commission (FCC) for public safety communication services and is also referred to as the Public Safety Frequency Band. Communication with these land mobile radios for public safety communication services has been extended by the FCC and is now available on part of the 700 MHz frequency band.

Known land mobile radio units do not provide combined dual band operation with full duplex transmissions. In order to provide full duplex transmission operation, these land mobile radios use bandpass filters external to the radio (e.g., a separate unit connected to the radio). For example, known land mobile radios provide single band operation that uses an external duplexer filter assembly connected to the radio to provide full duplex transmissions. The duplexer isolates the receiver from the transmitter in the radio, allowing simultaneous transmission and reception by the radio using the same antenna. Thus, separate units or chassis are used to provide simplex, half duplex and full duplex modes of operation. However, although different modes of operation, including full duplex transmissions may be provided by these known land mobile radios using an external duplexer, these radios are only capable of operating in the in a single frequency band, and in particular, the 800 MHz trunked radio frequency band.

Thus, these known land mobile radios are not only limited in their operating frequency range, but require external components, such as a duplexer, in order to provide full duplex communication. This results in a more costly and complex radio. Further, these radios do not provide operation in the different Public Safety Frequency Bands, and in particular, the 700 MHz Public Safety Frequency Band.

BRIEF DESCRIPTION OF THE INVENTION

According to an exemplary embodiment of the invention, a radio is provided that includes a transmit portion including a dual band filter and a receive portion including a dual band filter. The radio further includes a circulator connecting the transmit portion and the receive portion and configured to provide transmit and receive switching.

According to another exemplary embodiment of the invention, a dual band full duplex land mobile radio is provided that includes a transmit filter configured to provide bandpass filtering in two frequency bands and a receive filter configured as a diplex filter to provide filtering in two frequency bands. The dual band full duplex land mobile radio further includes a circulator configured to provide switching between a transmit mode and a receive mode and at least one switch connected to the transmit filter and configured to switch between a half duplex mode of operation and a full duplex mode of operation.

According to yet another exemplary embodiment of the invention, a method of filtering signals in a radio is provided. The method includes configuring a transmit filter to filter in two different transmit frequency bands and configuring a receive filter to filter in two different receive frequency bands. The method further includes configuring a circulator to switch between a transmit mode and receive mode to provide transmitting and receiving in the two different transmit and receive frequency bands using the transmit and receive filters.

DETAILED DESCRIPTION OF THE INVENTION

Various embodiments of the invention provide a mobile radio having full duplex operation in both the 700 MHz and 800 MHz operating frequencies, and more particularly, the Public Safety Frequency Bands within these frequency ranges. In operation, the various embodiments provide communication in simplex, half duplex and full duplex transceiver modes. Thus, a radio with a single chassis integrating simplex/half duplex/full duplex modes and multiple frequency band functionality is provided.

In general, various embodiments of the invention provide integration of full duplex operation into a radio chassis by combining the 700 MHz and 800 MHz transmit bands using a single bandpass filter for radio transmission and a diplex filter configured as a dual band front end filter for radio reception. The transmit and receive filters are connected using a circulator as the transmit/receive (T/R) junction to allow simultaneous operation of the transmitter and receiver.

Figure 1:
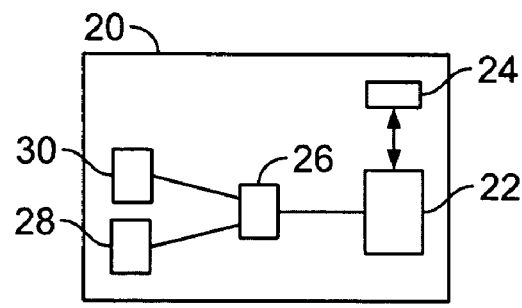
FIG. 1 is a radio constructed in accordance with various embodiments of the invention.

More particularly, and as shown in FIG. 1, various embodiments of the invention provide a radio 20, for example, a land mobile radio, having a transceiver 22 connected to an antenna 24 for transmitting and receiving signals to provide mobile wireless communication. It should be noted that in various embodiments, modifications are contemplated, such as, for example, a separate transmitter and receiver instead of a combined unit, such as the transceiver 22. The transceiver 22 is connected to a switch 26 (e.g., a circulator) for controlling connection of the transceiver 22 between a receive filter 28 and a transmit filter 30 for filtering signals that are received and transmitted, respectively, by the radio 20. The various components of the radio 20 are discussed in more detail below.

The radio 20 operates in multiple modulation modes in each of the 700 MHz and 800 MHz frequency bands. For example, the radio 20 may be configured to operate using both the OpenSky protocol and the APCO interoperability mode, as well as conventional FM operation. Using these different modulation modes, the radio 20 also is configured to operate in simplex, half duplex, and full duplex communication modes. Essentially, full duplex operation is integrated within the radio 20 by combining 700 MHz and 800 MHz transmit bands into a bandpass filter, for example, the transmit filter 30, and a diplex filter as a dual band front end filter, for example, the receive filter 28. Thus, full duplex simultaneous operation of the transmitter and receiver is provided in the 700 MHz and 800 MHz frequency bands.

Figure 2:
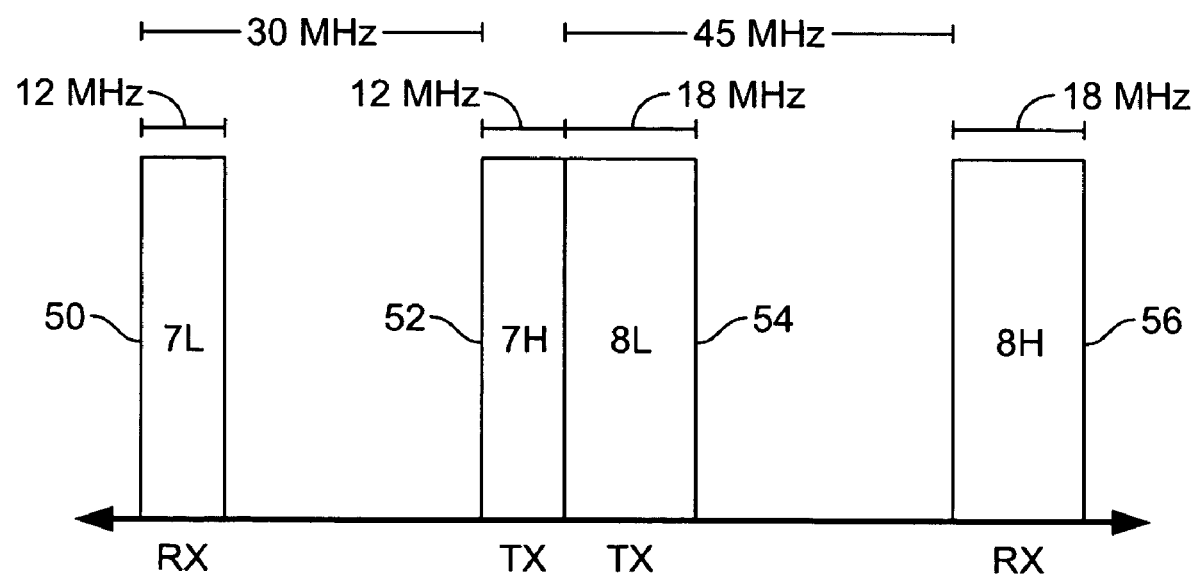
FIG. 2 is a chart showing frequency bands for the 700 MHz and 800 MHz Public Safety Frequency Band and which may be used by the radio of FIG. 1 to transmit and receive.

Specifically, the radio 20 is configured to operate in the 700 MHz and 800 MHz Public Safety Frequency bands. As shown in FIG. 2, the 700 MHz and 800 MHz Public Safety Frequency bands are set up to use one frequency band 50 and 56 for receive operation in each of the 700 MHz and 800 MHz frequency ranges, respectively, and, at a fixed separation, another frequency band 52 and 54 for transmit operation in each of the 700 MHz and 800 MHz frequency ranges, respectively. In particular, the 800 MHz mobile radio receive band (frequency band 56 labeled 8H for 800 High) is 851 MHz to 869 MHz and the 800 MHz mobile radio transmit band (frequency band 54 labeled 8L for 800 Low) is 806 MHz to 824 MHz. For the 700 MHz frequency band, the mobile radio receive band (frequency band 50 labeled 7L for 700 Low) is 764 MHz to 776 MHz and the mobile radio transmit band (frequency band 52 labeled 7H for 700 High) is 794 MHz to 806 MHz. It should be noted that the two mobile transmit bands, frequency bands 52 and 54 are adjacent as shown in FIG. 2.

Figure 3:
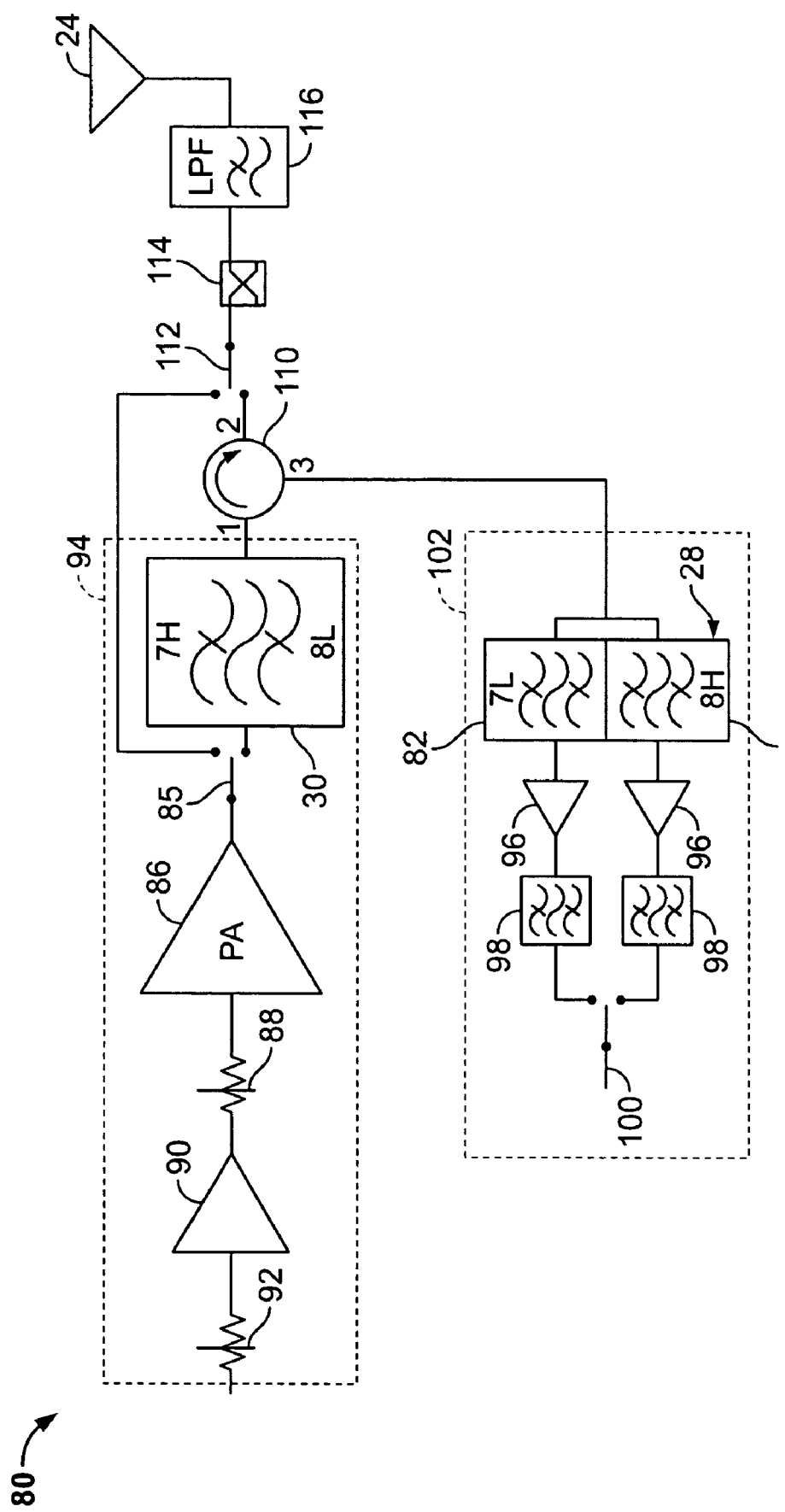
FIG. 3 is a block diagram of an integrated duplex architecture for a radio in accordance with an exemplary embodiment of the invention.

Referring now to FIG. 3, an exemplary embodiment of an integrated duplex architecture 80 for a radio 20 (shown in FIG. 1), includes the antenna 24 for receiving and transmitting signals to provide mobile wireless radio communication using the radio 20. The architecture 80 further includes the receive filter 28 and the transmit filter 30. In this exemplary embodiment, the receive filter 28 is a filter combination coupled using a resonant structure as is known and forms a diplex filter that operates as a dual band front end filter for the receiver of the radio 20. The receive filter 28 includes a first filter 82 configured to pass signals in the 7L frequency band (e.g., communicating received signals in the 7L frequency band) and a second filter 84 configured to pass signals in the 8H frequency band (e.g., communicating received signals in the 8H frequency band). Thus, the receive filter 28 passes signals in the 7L and 8H frequency bands and rejects or filters signals in the 7H and 8L frequency bands.

It should be noted that the first and second filters 82 and 84 may be connected, for example, by an internal microstrip "T" network as is known. This results in a unit wherein there is no need to switch the filters on the input to the receiver.

The receive filter 28, and more particularly, the output of each of the first and second filters 82 and 84, are connected to an amplifier 96, for example, a low-noise amplifier (LNA) or preamplifier. Each of the amplifiers 96 is connected to a filter 98, for example surface acoustic wave (SAW) filters, which are connected to a switch 100 for selecting between the filtered signals and connecting to a frequency mixer (not shown) as is known. This receive portion 102 provides for receiving signals in either the 7L or 8H frequency bands.

The transmit filter 30, in this exemplary embodiment, is a single bandpass filter configured to pass signals in the 7H and 8L frequency bands (e.g., communicating signals in the 7H and 8L frequency band to be transmitted by the radio 20). Thus, the transmit filter 30 passes signals in the 7H and 8L frequency bands and rejects or filters signals in the 7L and 8H frequency bands. In an exemplary embodiment, the transmit filter 30 is a ceramic dielectric resonator filter. In this exemplary embodiment, the transmit filter 30 is configured to provide a passband that is approximately 30 MHz wide and provide rejection at the receive frequency bands that may be as close as 18 MHz.

The input of the transmit filter 30 is connected to a switch 85, a power amplifier 86 (providing a final amplifier stage) that is connected to a first attenuator 88, an amplifier 90 and a second attenuator 92. The switch 85 is operable to select between a half duplex mode (switch bypassing the transmit filter 30) and a full duplex mode (switch connected to the transmit filter 30). The transmit portion 94 provides for transmitting signals from the radio 20 in either the 7H or 8L frequency bands.

The architecture 80 also includes a circulator 110 (e.g., a three-port ferrite circulator) operating as a T/R junction or switch allowing simultaneous operation of the transmit portion 94 and receive portion 102. The circulator 110 is connected to a switch 112 operable to select between a half duplex mode (switch 112 bypassing the circulator 110 and the transmit filter 30) and a full duplex mode (switch 112 connected to the circulator 110). The switch 112 is connected to a coupler 114 that samples the signals to control forward and reverse signal power (e.g., DC loop) as is known. The coupler 114 is connected to a filter 116, for example, a low pass filter, that filters harmonics when the transmit filter 30 is bypassed. The filter 116 is connected to the antenna 24. Essentially, the switches 85 and 112 isolate the transmit portion 94 during half duplex mode operation.

In an exemplary embodiment, the transmit portion 94 is connected to a first port or port 1 of the circulator 110, a second port or port 2 is connected to the antenna 24 via the coupler 114 and filter 116, and a third port or port 3 is connected to the receive portion 102. This arrangement provides dual band operation having full duplex capabilities.

In operation, using the various embodiments of the invention, the radio 20 can operate in a simplex, half duplex and full duplex mode of operation. In particular, in a simplex mode of operation, the radio 20 uses one channel frequency for either transmitting or receiving. Frequency separation is not used in the simplex modes and the radio 20 receives and transmits in the either the 7L or 8H frequency bands only. This mode is often referred to as a "talk-around" mode. For example, mobile radios in this mode of operation can communicate locally using a frequency that is normally the transmitter output of a base station.

In the half duplex mode of operation, the radio 20 uses two different frequencies, usually at a fixed separation, one for transmit and one for receive. Specifically, and in the various embodiments, in the 700 MHz band, the 7H/7L transmit/receive frequency pairs (e.g., frequency bands 52 and 50) are used for transmitting and receiving, and in the 800 MHz band the 8L/8H transmit/receive pairs (e.g., frequency bands 54 and 56) are used for transmitting and receiving. It should be noted that in half duplex operation, the radio does not receive during transmissions. For example, in OpenSky communications, the radio 20 can utilize this mode for both voice and data trunking calls. Additionally, in this mode of operation, the radio 20 may provide for communication using the APCO 25 protocol and/or conventional and trunked FM communication.

In full duplex mode of operation, the operation of the radio 20 is the same as half duplex operation, except the radio 20 may transmit and receive at the same time. This mode is efficient for data trunking calls, significantly improving data throughput.

In operation, the two switches 85 and 112, which in an exemplary embodiment are single pole double throw switches, in a full duplex mode of operation (e.g., OpenSky full duplex mode), are both are in the down position, such that a transmitted signal passes through the transmit filter 30, which in various embodiment may be, for example, a multi-pole dielectric resonator such as a five-pole dielectric resonator or a combline filter that limits out-of-band noise. Once filtered, the signal passes through the circulator 110 and out to the antenna 24 through the coupler 114, which in this exemplary embodiment is a power-sampling directional coupler, and the filter 116, which in this exemplary embodiment is a harmonic rejection lowpass filter. Thus, a signal in either the 700 MHz or 800 MHz downlink bands can be simultaneously received and passed from port 2 of the circulator to port 3, then to the a receiver input (not shown) of the radio 20.

In a half duplex mode of operation (e.g., OpenSky 700/800 MHz half duplex mode), the switch 85 is fixed in the up position, and the switch 112 toggles with the transmit waveform, for example, an OpenSky TDMA transmit waveform. During a transmit burst, the switch 112 is in the up position. In contrast to full duplex operation, this half duplex mode of operation eliminates the insertion loss of the transmit filter 30 and the circulator 110. It should be noted that when the radio 20 is receiving between TDMA bursts, the switch 112 is in a down position, connecting the antenna 24 to the receive portion 102.

In a simplex mode of operation and other half duplex modes such as, for example, TIA-102 and conventional analog FM, the radio 20 operates in a classical push-to-talk "keyed" manner, with the switch 85 again remaining in the up position. When keyed to transmit, the switch 112 is up, bypassing the loss of the transmit filter 30 and the circulator 110. With the radio 20 unkeyed, the switch 112 is down in the receive position.

It should be noted that the broadband noise out of the amplifier 86 will appear in the receive band and be added with thermal noise at the antenna 24 to raise the noise floor of the receive portion 102. This will increase the amount of signal needed at the antenna 24 in order to maintain a given carrier signal to noise ratio. This is referred to as "desensitization." The receiver desensitization is minimized by the use of the transmit filter 30 in the transmit portion 94 that attenuates the noise power in the receive band. It also should be noted that because the transmit filter 30 is configured to provide filtering at both the 700 MHz and 800 MHz mobile transmit bands, there is no need to switch filters.

Thus, various embodiments of the invention provide a radio 20, for example, a mobile radio, with dual band, full duplex functionality in a single unit or chassis. A radio 20 providing flexible 700/800 MHz operation for dual band trunking thereby may be provided.

While the invention has been described in terms of various specific embodiments, those skilled in the art will recognize that the invention can be practiced with modification within the spirit and scope of the claims.

What is claimed is:

1. A radio comprising:
a transmit portion including a dual band filter;
a receive portion including a dual band filter; and
a circulator connecting the transmit portion and the receive portion and configured to provide transmit and receive switching;
an antenna connected to the circulator, and wherein the transmit portion is connected to a first port of the circulator, the antenna is connected to a second port of the circulator and the receive portion is connected to a third port of the circulator; and
at least one switch connected to the dual band filter of the transmit portion and configured to switch between a half duplex mode of operation and a full duplex mode of operation.

2. A radio in accordance with claim 1 wherein the dual band filter of the receive portion comprises a diplex filter.

3. A radio in accordance with claim 1 wherein the dual band filters are configured to filter signals in each of a 700 MHz and 800 MHz frequency band.

4. A radio in accordance with claim 1 wherein the dual band filter of the transmit portion is configured to pass signals in a 7H and 8L frequency band of a Public Safety Frequency Band and the dual band filter of the receive portion is configured to pass signal in a 7L and 8H frequency band of the Public Safety Frequency Band.

5. A radio in accordance with claim 1 wherein the dual band filter of the transmit portion comprises ceramic dielectric resonater filter.

6. A radio comprising:
a transmit portion including a dual band filter;
a receive portion including a dual band filter; and
a circulator connecting the transmit portion and the receive portion and configured to provide transmit and receive switching, and wherein the transmit portion and receive portion are configured to provide operation in one of a simplex mode, half duplex mode and full duplex mode.

7. A dual band full duplex land mobile radio comprising:
a transmit filter configured to provide bandpass filtering in two frequency bands;
a receive filter configured as a diplex filter to provide filtering in two frequency bands;
a circulator configured to provide switching between a transmit mode and a receive mode; and
at least one switch connected to the transmit filter and configured to switch between a half duplex mode of operation and a full duplex mode of operation.

8. A dual band full duplex land mobile radio in accordance with claim 7 wherein the two frequency bands comprise a 700 MHz and 800 Hz frequency band.

9. A dual band full duplex land mobile radio in accordance with claim 7 wherein the transmit filter is configured to pass signals in a transmit band (i) between about 794 MHz and about 806 MHz and (ii) between about 806 MHz and about 824 MHz, and the receive filter is configured to pass signals in a receive band (i) between about 764 MHz and 776 MHz and (ii) between about 851 MHz and 869 MHz.

10. A dual band full duplex land mobile radio in accordance with claim 7 further comprising an antenna and wherein the transmit filter is connected to a first port of the circulator, the antenna is connected to a second port of the circulator and the receive filter is connected to a third port of the circulator.

11. A dual band full duplex land mobile radio in accordance with claim 7 further comprising a first switch connected to an input of the transmit filter and a second switch connected to the circulator to provide half duplex and full duplex modes of operation.

12. A dual band full duplex land mobile radio in accordance with claim 7 wherein the transmit filter comprises a single filter configured to provide bandpass filtering in the two frequency bands and the receive filter comprises two separate filters to provide filtering in the two frequency bands.

13. A dual band full duplex land mobile radio in accordance with claim 7 wherein the transmit filter is bypassed in the half duplex mode of operation.

14. A dual band full duplex land mobile radio in accordance with claim 7 further comprising a low pass filter operable in the half duplex mode of operation.

15. A method of filtering signals in a radio, the method comprising:
configuring a transmit filter to filter in two different transmit frequency bands;
configuring a receive filter to filter in two different receive frequency bands;
configuring a circulator to switch between a transmit mode and receive mode to provide transmitting and receiving in the two different transmit and receive frequency bands using the transmit and receive filters; and
configuring a switch to switch between a half duplex and full duplex mode of operation.

16. A method in accordance with claim 15 wherein one of each of the transmit and frequency bands are in the 700 MHz and 800 MHz frequency bands.

* * * * *